United States Patent [19]
Ooi

[11] Patent Number: 5,978,479
[45] Date of Patent: Nov. 2, 1999

[54] DESCRAMBLER

[75] Inventor: Shinichi Ooi, Tokyo, Japan

[73] Assignee: Kabushiki Kaisha Toshiba, Kawasaki, Japan

[21] Appl. No.: 08/676,519

[22] Filed: Jul. 2, 1996

[30] Foreign Application Priority Data

Jul. 7, 1995 [JP] Japan ................................. 7-172160

[51] Int. Cl.⁶ ........................... H04N 7/167; H04K 1/00; H04L 9/00
[52] U.S. Cl. ............................... 380/10; 380/20; 380/23; 380/25; 380/49
[58] Field of Search ................................. 380/10, 20, 23, 380/25, 49

[56] References Cited

U.S. PATENT DOCUMENTS

| | | | |
|---|---|---|---|
| 5,237,610 | 8/1993 | Gammie et al. | 380/10 |
| 5,282,249 | 1/1994 | Cohen et al. | 380/23 |
| 5,481,609 | 1/1996 | Cohen et al. | 380/16 |
| 5,666,412 | 9/1997 | Handelman et al. | 380/4 |
| 5,790,666 | 8/1998 | Ooi | 380/20 |

FOREIGN PATENT DOCUMENTS

| | | |
|---|---|---|
| 3-210843 | 9/1991 | Japan . |
| 4-138735 | 5/1992 | Japan . |

*Primary Examiner*—Gail O. Hayes
*Assistant Examiner*—Hrayr A. Sayadian
*Attorney, Agent, or Firm*—Foley & Lardner

[57] ABSTRACT

A descramble section extracts required information for descrambling transmitted together with TV signals and converts scrambled signals to ordinary TV signals in response to input control signals. A microcomputer system has a function of processing view-contract management using a required information for descrambling and applies the control signals to the descramble section based on a result of the viewer-contract management processing, when an IC card is not connected. On the other hand, when IC card is connected, the microcomputer system gives the required information for descrambling to the IC card and gives control signals from the IC card to the descramble section without processing the viewer-control management. The IC card performs the viewer-contract management processing using the necessary information for descrambling, and gives control signals to the microcomputer system based on the result of the viewer-contract management processing.

8 Claims, 6 Drawing Sheets

DESCRAMBLER

BACKGROUND OF THE INVENTION

This invention relates to a descrambler for undoing scrambled signals such as video signals and audio signals and decode them to ordinary signals.

In paid broadcasting, such as CATV (a community antenna television) and satellite broadcasting, video and audio signals are scrambled so that the broadcasting can be received by only such customers who have contracted and are paying fees. A device for undoing the scramble from scrambled video and audio signals is called a descrambler, and inner processing made by the descrambler is divided largely into two steps.

A first processing step of the descrambler utilizes transmission data transmitted from a broadcasting station to determine whether the scramble should be undone or not, and as a result, if it is determined to undo the scramble, the scramble given to video and audio signals are undone to decode them to the original signals by a second processing step. In the first processing step, status of a contract between the broadcasting station and the viewer is determined by the descrambler, and an ON/OFF descramble processing is managed. This process is hereinafter called viewer-contract management processing.

Figure 1:
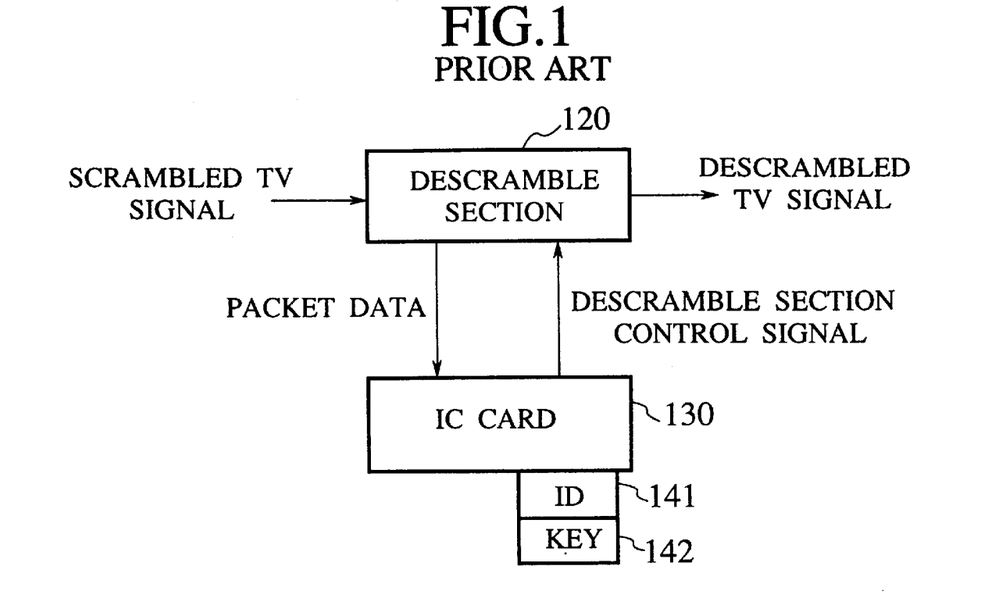
FIG. 1 is a view of an example of a conventional descrambler comprising an IC card having a built-in microcomputer system.
Figure 2:
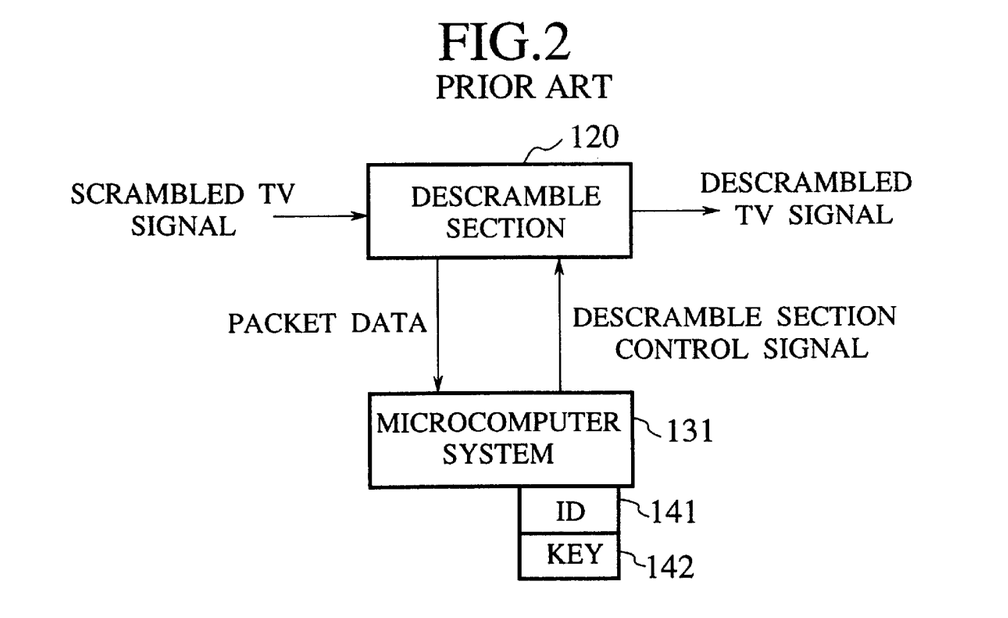
FIG. 2 is a view of example of a conventional descrambler comprising a universal microcomputer system.

In a general descrambler, the viewer-control management processing is carried out by using a microcomputer system. FIG. 1 and FIG. 2 show examples of the type of processing.

Referring to FIG. 1, the descrambler shown uses an IC (integrated circuit) card 130 having a microcomputer system built therein. The process is carried out by the microcomputer system built-in the IC card 130, thereby a descramble section 120 is controlled. According to this control, undoing of the scramble from scrambled video and audio signals are processed in the descramble section 120.

Details of this descrambler will now be described below.

The process carried out in the descramble section 120, which is a block constructing descrambler, can be largely divided into two steps. By a first processing step, a packet which has been multiplexed with television signals is extracted from TV signals, and the extracted packet data is given to the IC card 130 (a microcomputer system). Then, the scramble is undone by a second processing step.

The packet contains information, such as, individual information, program information, and message information. These packet data are transmitted by time-divisionally multiplexing with video signals and audio signals, e.g. multiplexing with vertical interval signal, or by frequency multiplexing. Then, by the extraction process from the packet, the data is extracted and provided to the microcomputer system in the IC card 130.

Of the information contained in the packet, the individual information relates to individual contractors. The descrambler for viewers who have contracted and are paying is given individual information containing, for example, permission for descrambling for a certain period, e.g., for a month, by a sponsor for broadcasting so that the descrambler may make program information available. On the other hand, a descrambler for viewers who have not contracted is not provided with information for permission of descrambling, so that program information is not available. In the case when a viewer has canceled the contract, or a viewer has failed to pay fees, the descrambler for such viewer is given individual information containing information for not permitting a descramble.

Further, the individual information includes an ID (an identification) of each contractor, and when the ID matches with the ID stored in an ID memory 141 in the IC card, transmitted individual information is taken by the microcomputer system in the IC card 130. Furthermore, the individual information is enciphered by a peculiar key stored in a key memory 142, and the microcomputer in the IC card 130 makes the decoding process by using the key, and reads only correctly decoded information, thereby to avoid reading other viewer's individual information.

The program information relates to a broadcasting program, of which condition is compared with that of individual information. In the case of the descrambler shown in FIG. 1, the microcomputer in the IC card 130 compares the given individual information with the program information, determines whether the viewer of the given individual information has a right to receive the program being broadcasted. If the viewer has the right, the information necessary to undo the scramble is separated from the program information, and such separated information is applied to the descrambler section 120 as scramble control signals.

As described above, the microcomputer in the IC card 130 controls the descramble section 120. In some cases, this program information is enciphered similar to the individual information. In this case, a key for decoding the codes is contained in the individual information, and the key is given to each descrambler for processing.

It may be that a descrambler utilizing an IC card receives only the program information and stores the individual information in advance at the time of issuing the IC card.

The process described above is an example of a descrambler utilizing an IC card. FIG. 2 shows an example of descrambler which does not utilize an IC card.

In the example of FIG. 2, a universal microcomputer system 131 is used instead of an IC card. With this example, too, packet data, which is extracted by a descramble section 120, is given to the microcomputer system 131, which is the same as in the case of using an IC card 130, whereupon the microcomputer system 131 carries out the viewer-contract management processing and controls the descramble section 120. This operation is the same as the IC card 130 of FIG. 1.

In future digital television broadcasting, the packet will not be multiplexed with television signals, but all signals including the television signals will be put in a packet form so that they will be treated the same.

In the meantime, with a descrambler which uses an IC card as shown in FIG. 1, the cost of an IC card is higher than the cost of a universal one-chip microcomputer, and thus undesirably requires an increased amount of initial investment for starting mass production.

On the other hand, a system which uses a universal one-chip microcomputer, as shown in FIG. 2, lowers the production cost. However, in a descrambler which uses a universal one-chip microcomputer, if contents of the processing stored in the microcomputer are decoded and an illegal descrambler is manufactured, the decoded descrambler must be changed entirely to a new descrambler, thereby requiring that the microcomputer software be changed, and thus preventing safe and secure operations in future.

SUMMARY OF THE INVENTION

It is therefore an object of the present invention to provide a descrambler which allows a lesser initial investment and has a high security against any illegal action.

In accordance with this invention, there is provided a descrambler comprising: a descramble section for extracting required information for descrambling transmitted together with TV signals and converting scrambled TV signals to ordinary TV signals in response to input control signals; and a microcomputer system having a function of processing viewer-contract management using the required information for descrambling, and for applying the control signals to the descramble section based on a result of the viewer-contract management processing; and wherein the microcomputer system being capable of detecting the connection of an IC card, and when the IC card connected, the microcomputer system giving the required information for descrambling to the IC card and giving control signals from the IC card to the descramble section without processing the viewer-contract management, and the IC card processing the viewer-contract management using the required information for descrambling and giving the control signals to the microcomputer system based on the result of viewer-contract management processing.

According to this invention, a descramble section extracts required information for descrambling transmitted together with TV signals and converts scrambled signals to ordinary TV signals in response to input control signals. A microcomputer system has a function of processing viewer-contract management using a required information for descrambling and applies the control signals to the descramble section based on a result of the viewer-contract management processing, when an IC card is not connected. On the other hand, when IC card is connected, the microcomputer system gives the required information for descrambling to the IC card and gives control signals from the IC card to the descramble section without processing the viewer-contract management. The IC card performs the viewer-contract management processing using the necessary information for descrambling, and gives control signals to the microcomputer system based on the result of the viewer-contract management processing.

According to this invention, a descramble section extracts required information for descrambling transmitted together with TV signals and converts scrambled signals to ordinary TV signals in response to input control signals. A microcomputer system has a function of processing viewer-contract management using a required information for descrambling and applies the control signals to the descramble section based on a result of the viewer-contract management processing, when an IC card is not connected. On the other hand, when IC card is connected, the microcomputer system gives the required information for descrambling to the IC card and gives control signals from the IC card to the descramble section without processing the viewer-contract management. The IC card performs the viewer-contract management processing using the necessary information for descrambling, and gives control signals to the microcomputer system based on the result of the viewer-contract management processing.

As described above, in accordance with the descrambler of this invention, the microcomputer system performs the viewer-contract management processing and controls descramble section when the IC card is not connected. However, when the IC card is connected, the IC card is capable of carrying out the viewer-contract management processing and controlling the scramble section. Consequently, even when the controlling operation is performed by the microcomputer system at an initial stage, upon connection of the IC card, the control is made according to the contents of the IC card. For this reason, this invention allows a lesser initial investment by the use of the microcomputer system, and, subsequently a connection of the IC card facilitates safety measures when any illegal actions occur, thus, in turn results in providing a system with a high level of security.

According to a preferable aspect of this invention, the IC card compares its own ID with an ID contained in the required information for descrambling, and when matched, takes individual information and performs processing of the viewer-contract management.

According to another preferable aspect of this invention, the microcomputer system, when the IC card is connected, inputs and stores an ID from the IC card, and compares the stored ID with the ID contained in the required information for descrambling, and when not matched, does not give the required information for descrambling to the IC card.

According to yet another preferable aspect of this invention, the descrambler further comprises a memory for storing an ID contained in the IC card or an ID of the microcomputer system, and a processing section for inputting the required information for descrambling from the descramble section, comparing the ID with the ID contained in the required information for descrambling, and when matched, and giving the required information for descrambling to the microcomputer system.

According to another aspect of this invention, the microcomputer system confirms whether the IC card is connected or not by trying to communicate with the IC card.

According to a further aspect of this invention, the required information for descrambling is in a packet form and time-divisionally multiplexed or frequency multiplexed in video signals or audio signals.

In accordance with this invention, the invention provides a descrambler comprising a descramble section for extracting required information for descrambling transmitted together with TV signals and converting scrambled TV signals to ordinary TV signals in response to input control signals; and a microcomputer system having a function for processing viewer-contract management using the required information for descrambling, and for applying the control signals to the descramble section based on a result of the viewer-contract management processing; and wherein the microcomputer system giving the required information for descrambling to the IC card and giving control signals from the IC card to the descramble section without processing the viewer-contract management, when information instructing control by an IC card being transmitted through the descramble section, and the IC card processing the viewer-contract management using the required information for descrambling and giving the control signals to the microcomputer system based on a result of viewer-contract management processing.

According to another aspect of this invention, the microcomputer system displays a message which urges to insert the IC card when the information instructing control by the IC card is transmitted through the descramble section and the IC card is not connected.

The nature, principle and utility of the invention will become more apparent from the following detailed description when read in conjunction with the accompanying drawings.

DESCRIPTION OF THE PREFERRED EMBODIMENTS

The preferred embodiments of this invention will be clearly understood from the following description by referring to accompanying drawings.

Figure 3:
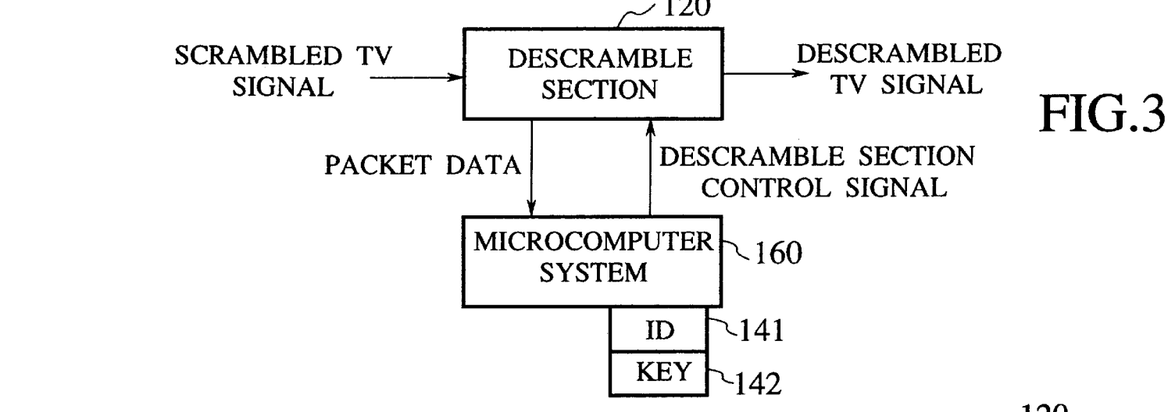
FIG. 3 is a view of a descrambler according to a first embodiment of this invention, particularly, in the case when an IC card is not inserted.
Figure 4:
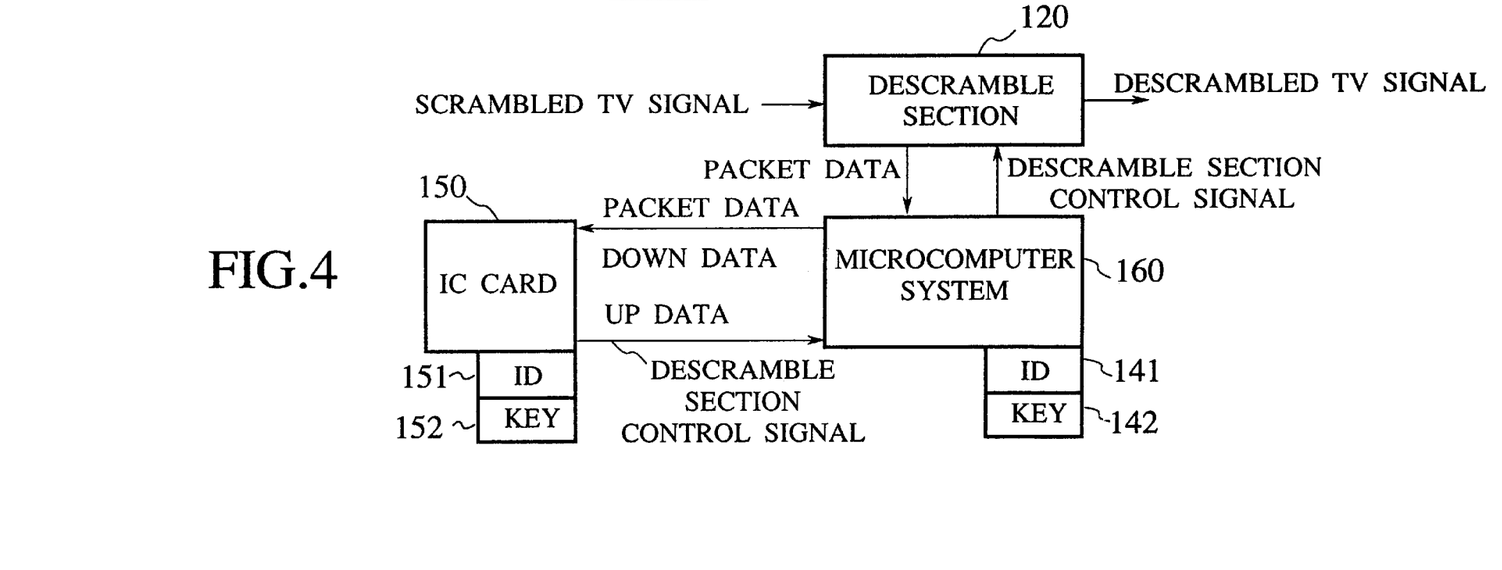
FIG. 4 is a view of a descrambler according to a first embodiment of this invention, particularly, in the case when an IC card is inserted.

FIGS. 3 and 4 illustrate a structure of a descrambler according to a first embodiment. With the descrambler of this first embodiment, the IC card is freely inserted or pulled out by means of a connector (not shown). FIG. 3 shows the state of a descrambler without the IC card inserted, and in FIG. 4 the IC card is inserted. The connector is made so as to require lesser number of pins. In the drawings, the transmitting and receiving communication between the microcomputer system and the IC card are made separately as an example. However, it is of course possible to use only a single line for a bi-directional communication.

The descramble section 120 is substantially the same as the conventional one for undoing the scramble of scrambled TV signals, converting the latter to ordinary TV signals, extracting a packet which has been multiplexed in the scrambled TV signals, and applying the extracted packet data to the universal microcomputer system 160. This packet is transmitted from a broadcasting station and has the required information for descrambling. The operational condition of the descramble section 120 is controlled by descramble section control signals obtained by the microcomputer system 160.

The microcomputer system 160 processes the viewer-contract management with respect to data such as individual information, program information, and message information in the packet obtained by the descramble section 120 by using an ID written in an ID-memory 141 and a Key written in a key-memory 142 to control the descramble section 120. As shown FIG. 3, although the IC card is not inserted, this microcomputer system 160 processes the viewer-contract management by itself. Namely, the microcomputer system 160 uses the data in the packet to decide whether to undo the scramble or not and to confirm the contract with the broadcasting station, thereby controlling the ON/OFF operation of descramble processing. As shown in FIG. 4, when the IC card 150 is inserted, the microcomputer system 160 series as a buffer to interface the descramble section 120 and the IC card 150.

The IC card 150 has a communication port for communicating with the microcomputer system 160 and, through the port, receives the packet data obtained by the descramble section 120. The IC card 150 has a built-in microcomputer, and the microcomputer processes the viewer-contract management by utilizing the ID written in the ID-memory 151 and the Key written in the key-memory 152. The IC card 150 provides the descramble section 120 with the control signals to control the descramble section 120 based on the packet data. The packet data is referred to as down data to the IC card 150, and the control signals for the descramble section 120 are referred to as up data.

Figure 5:
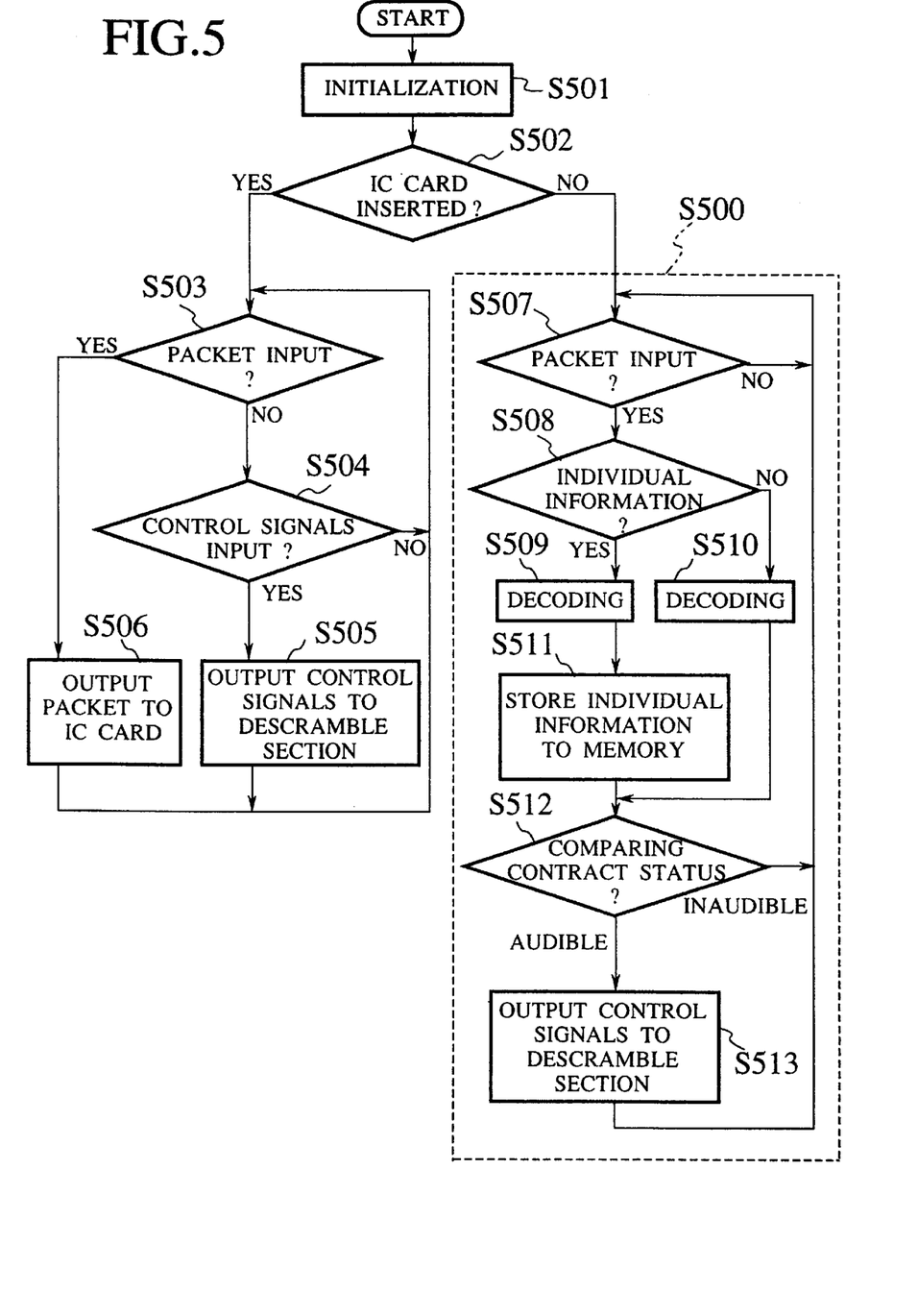
FIG. 5 is a flow chart showing an operation of a microcomputer system according to a first embodiment.

FIG. 5 is a flow chart showing an operation of the microcomputer system 160. The description of the operation will now be made in accordance with this flow chart.

When a power switch is turned ON (or reset to reboot), the microcomputer system 160 initializes its system (S501) and confirms whether the IC card 150 is inserted or not by means of the communication port (S502). This serves as means for detecting the insertion of the IC card 150. When the IC card 150 is inserted, the main process of the microcomputer system 160 is switched-over to the IC card 150.

When the IC card 150 is connected, the communication with the microcomputer of the IC card 150 and the descramble section 120 is carried out by the process as shown on the left side of FIG. 5, and the viewer-contract management is processed by the IC card 150. When the IC card 150 is not connected, the microcomputer of the IC card 150, therefore, the viewer-contract management is processed by the microcomputer system 160 (S500).

When the IC card 150 is not connected, the microcomputer system 160 is in the state for monitoring the packet input from the descramble section 120 (S507). When a packet is input, the microcomputer system 160 determines whether it is individual information packet or program information packet (S508), and if it is an individual information packet, individual information packet data is decoded (S509). When the decoding is successfully made, the decoded individual information is stored in the built-in storage (S511).

Thereafter, the contract status is compared. Specifically, it is decided whether it is acceptable to receive the service by comparing the stored individual information with the decoded program information (S512). When it is determined to be an audible one, the microcomputer system 160 provides the descramble section 120 with the control signals for descrambling (S513), and a descrambling operation is made in the descramble section 120. When it is determined to be an inaudible one, the microcomputer system 160 controls in the descramble section 120 so as not to make the descramble operation. The signals for controlling the descramble may, for example, be the signal which simply turns ON/OFF the descramble. To secure the safety for deciphering, a key for the descramble may be provided in the program information, and this key may be given to the descramble section only when it is audible.

When the IC card 150 is connected, the process on the left of FIG. 5 is carried out. The microcomputer system 160 outputs all the data of the packet input when the packet is input from the descramble section 120 (S506). In the IC card 150, there is provided the same viewer-contract management processing as that of the microcomputer system 160.

When a packet is not input, the microcomputer system 160 monitors the input of the control signals from the IC card 150 (S504). When the microcomputer system 160 receives the control signals from the IC card 150, the microcomputer system 160 outputs the control signals to the descramble section 120 (S505) to control the ON/OFF operation of descrambling. Thus, the IC card 150 processes the viewer-contract management.

It may happen that the data from the IC card 150 and the data from the descramble section 120 are simultaneously input to the microcomputer system 160. In this case, the microcomputer system 160 controls the transferred data traffic to avoid collision of the data between the descramble section 120 and the IC card 150.

In the case of utilizing the IC card 150 for processing the viewer- contract management, the microcomputer system 160 is operated as a buffer, and it is not used for processing the viewer-contract management regarding the safety of the system. Unless a correct IC card which responds to the operation is inserted, the descramble processing is not correctly made, and consequently, the safety is assured.

When the processing of the microcomputer system 130 as a decoder is analyzed, and as a result of the analysis an illegal decoder is used, an IC card 150 is distributed to the contractor. This card 150 can perform the viewer-contract management of a protocol which is different from that of a management performed by the microcomputer system 160. Consequently, there is no need for replacing the whole descrambler. The illegal action is dealt with by only inserting the IC card 150. With the different protocols, it is available to a change in cryptography of the individual information or the program information and change in an arrangement of the packet (a length of data or data contained in the packet).

It is not always required that the ID and the Key respectively stored in the ID-memory 151 and the key-memory 152 in the card 150 be identical with the ID and the Key stored in the ID-memory 141 and the key-memory 142 in the microcomputer system 160. For instance, only the ID may be the same or only the Key may be the same, moreover it may differ from each other. The ID or the Key in the IC card 150 is determined in accordance with the state of the illegally used descramble when the processed information in the microcomputer system 160 is deciphered.

With the descrambler of this invention as described above, not only the IC card 150 but also the microcomputer system 160 itself has a function for processing the viewer-contract management. Consequently, it allows the descrambler with the microcomputer system 160 to be operated without using the IC card for some period of time after system installation. It allows the descrambler to make a new processing by inserting the IC card and results in a smaller amount of initial investment.

The switching-over of processing in the microcomputer system 160 is carried out not only by the above described manner but also by controlling the transmission of the packet data from the broadcasting station so as to change-over the control of the system to the IC card from the microcomputer system. In this case, it may happen that, even when the IC card is not inserted, the data for changing over the processing is sent from the broadcasting station. In such a case, however, the microcomputer 160 may give a warning that the IC card is not inserted, for instance, by displaying a message which urges to insert the IC card on a display screen.

A second embodiment of the invention will now be described.

According to the first embodiment as described above, in the communication between the microcomputer 160 and the IC card 150, the microcomputer system 160 is operated so as to relay all the packet data received from the descramble section 120. However, it is not always required that the IC card 150 be provided with all the individual information of the packet data, and may be provided with only the required information for the microcomputer of the IC card 150. The second embodiment shows one example, and has substantially the same structure as the first embodiment in FIGS. 3 and 4. The microcomputer system is operated as shown in a flow chart of FIG. 6. Description is now made in accordance with FIG. 6.

Figure 6:
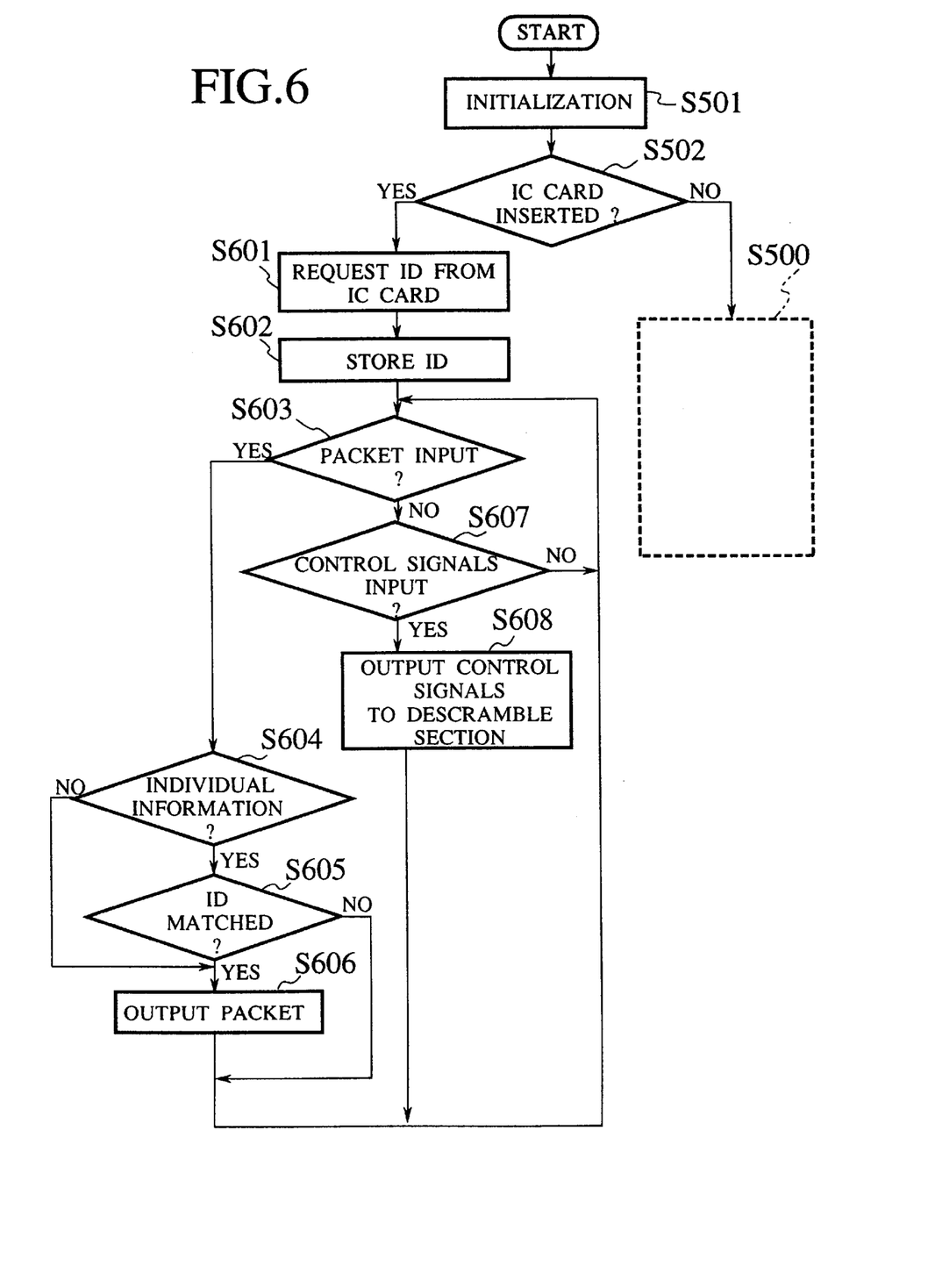
FIG. 6 is a flow chart showing an operation of a microcomputer system according to a second embodiment.

When the power switch is turned ON (or reset to reboot), the microcomputer system 160 initializes its system (S501), and confirms whether the IC card 150 is inserted or not by trying to communicate with the IC card 150 through a communication port (S502). When the IC card 150 is not connected, the microcomputer system 160 can not communicate with the IC card 150, therefore the viewer-contract management is controlled by the microcomputer system 160 itself (S500). This process is the same as that of the above described in FIG. 5.

When the IC 150 is connected, the process on the left of FIG. 6. is carried out. The microcomputer system 160 requests the ID stored in the ID-memory 151 from the IC card 150 (S601). Consequently, the IC card 150 gives the stored ID to the microcomputer system 160, which stores the ID in itself (S602).

The microcomputer system 160 determines whether the packet is input or not from the descramble section 120 (S603). When the packet is input from the descramble section 120, the microcomputer system 160 determines whether it is an individual information packet or a program information packet (S604). In the case of the individual information packet, the microcomputer system 160 determines whether the stored ID matches or not with the ID of the individual information packet (S605). When both IDs are matched, the individual information packet is output to the IC card 150 (S606). The data in the individual information packet is decoded by the IC card 150. On the contrary, at the Step 604, when the packet input from the descramble section 120 is the program information packet, the program information packet is given to the IC card 150 (S606). Thereafter, the microcomputer system 160 is in the state for monitoring the packet input from the descramble section 120 (S603).

At the Step 603, when a packet is not input, the microcomputer system 160 monitors the control signals from the IC card 150. (S607). When the descramble section control signals are input from the IC card 150, the microcomputer system 160 gives the descramble section 120 the descramble section control signals (S608) and controls the ON/OFF of the descramble. The microcomputer system 160 returns in the state for monitoring the packet from the descramble section 120 (S603).

According to the embodiment above described, in the same manner as the first embodiment, even if the process relating to the individual information packet and the process relating to the descramble section control signals are carried out by the microcomputer system 160, the descrambler with microcomputer system 160 can be operated without using the IC card for some period after system installation. If necessary, the descrambler performs new processing by inserting the IC card 150.

The description will now be made of a third embodiment.

According to the third embodiment, a processing section is added instead of using the microcomputer system according to the second embodiment, wherein the processing section is provided for selectively extracting a required individual information data from the individual information in the packet.

Figure 7:
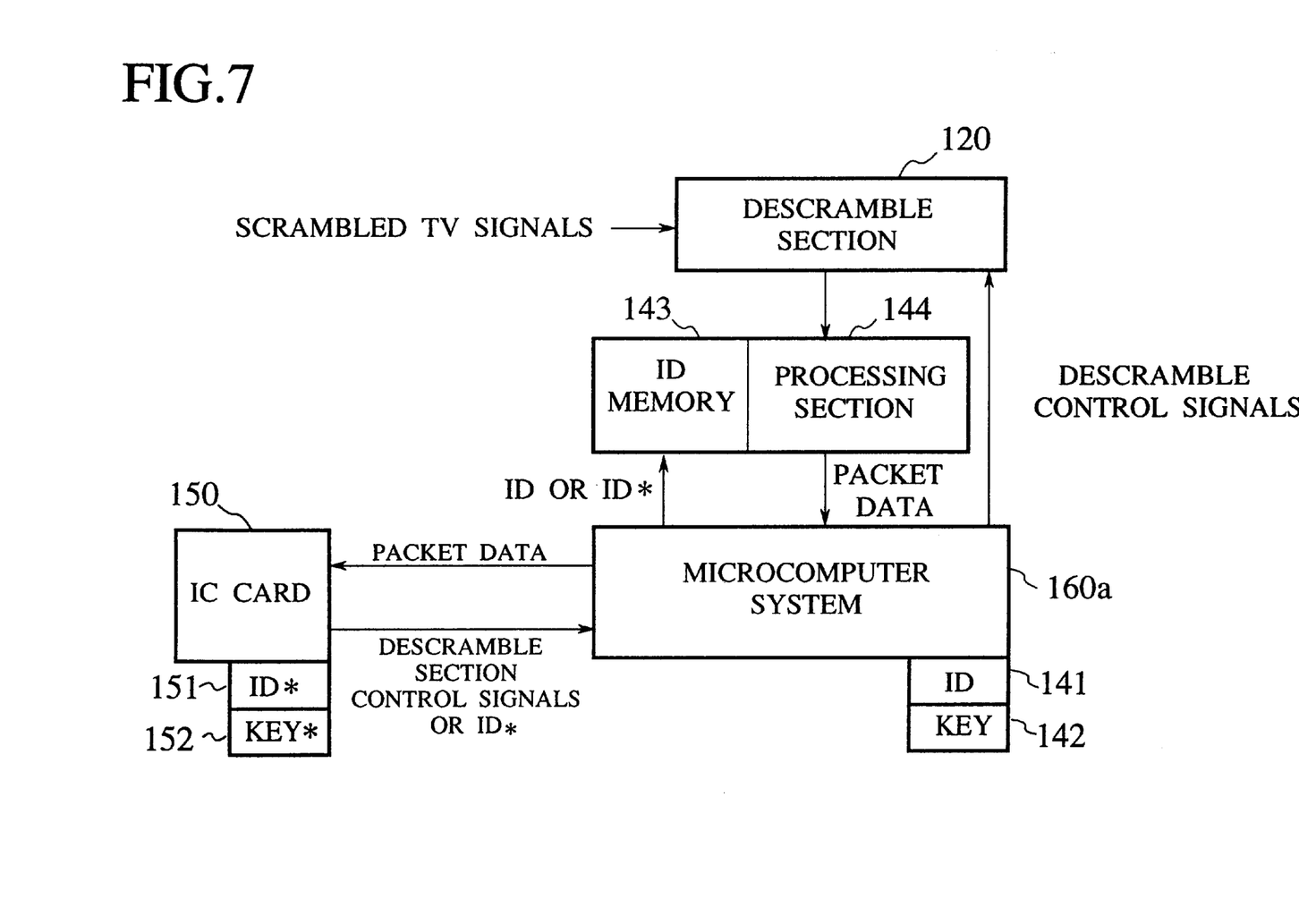
FIG. 7 is a view of a descrambler according to a third embodiment of this invention.

FIG. 7 shows an example of the arrangement. The descramble section 120 and the IC card 150 are the same as those of the above described embodiment. It is characterized by having a processing section 144 for selectively extracting the required individual information. This processing section 144 provides the required individual information data extracted from the individual information packet from the descramble section 120 to a microcomputer system 160a. An ID-memory 143 for storing the ID therein is provided.

Figure 8:
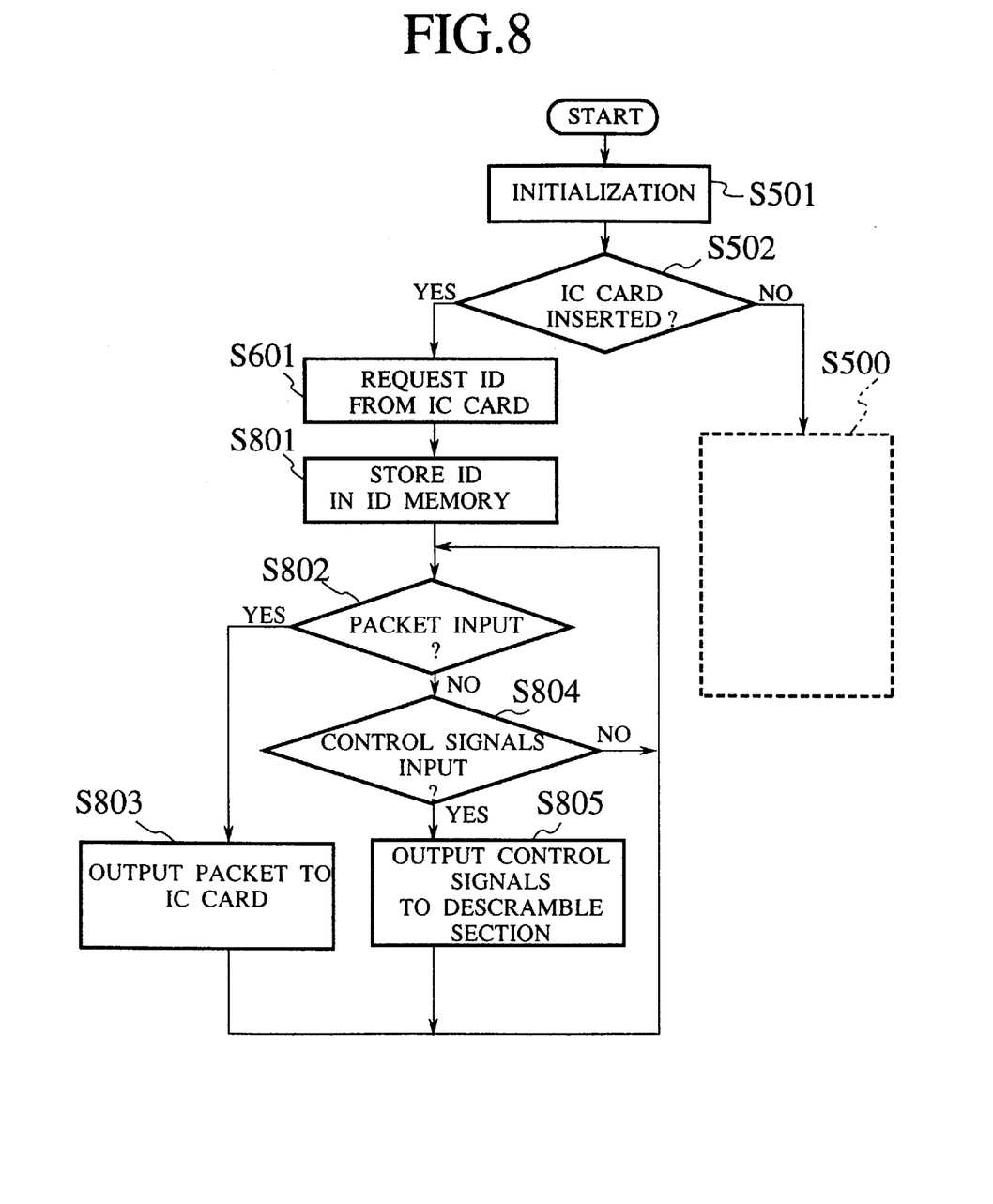
FIG. 8 is a flow chart showing an operation of a microcomputer system according to a third embodiment.

FIG. B is a flow chart showing an operation of the microcomputer system 160a. The description of the operation will now be made in accordance with this flow chart.

When a power switch is turned ON (or reset to reboot), the microcomputer system 160a initializes its system (S501) and confirms (S502) whether an IC card 150 is inserted or not by trying to communicate with the IC card 150 through the communication port. When the IC card 150 is not connected, the microcomputer system 160a can not communicate with the IC card 150, therefore, the viewer-contract management is processed by the microcomputer system 160a (S500). This process is the same as that of FIG. 5 described above.

When the IC card 150 is connected, the process on the left of FIG. 8 is carried out. The microcomputer 160a requests the IC card 150 for an ID* stored in the ID-memory 151 (S601). Consequently, the ID card provides the microcomputer system 160a with the stored ID* in the ID-memory 151. The stored ID* is transferred to the ID-memory 143 to be stored therein by the microcomputer system 130a (S801).

Thereafter, it is determined whether the packet is input from the descramble section 120 (S802). When the packet is input from the descramble section 120, the input packet data is output to the IC card 150 (S803).

When the packet is not input, the microcomputer system 160a monitors the descramble section control signals from the IC card 150 (S804). When the descramble section control signals are input from the IC card 150, the microcomputer system 160a outputs the descramble section control signals to the descramble section 120 (S805) to control the ON/OFF operation of descrambling. Thereafter, the microcomputer system 160a returns in the state of monitoring the packet from the descramble section 120 (S802).

According to the embodiment as described above, the processing section is independently provided for selectively extracting the individual information. Even in this case, it is possible for the descramble with the microcomputer system 130 to be operated without using the IC card for some period after the system installation in the same manner of first embodiment. If necessary, the descrambler performs new processing by inserting the IC card 150.

According to the embodiments above described, when the IC card is not connected, the microcomputer system processes the viewer-contract management and controls the descramble section. When the IC card is connected, the IC card processes the viewer-contract management and controls the descramble section. Accordingly, even if the controlling operation is initially controlled by the microcomputer system, upon connecting the IC card, the control is made according to the contents of IC card. Because of this arrangement, the initial investment is lowered by the use of the microcomputer system, and subsequently, connection of the IC card facilitates safety measures when any illegal actions occur, this in turn, results in providing a system with high security.

It should be understood that many modifications and adaptations of the invention will become apparent to those skilled in the art and it is intended to encompass such obvious modifications and changes in the scope of the claims appended hereto.

What is claimed is:

1. A descrambler, comprising:

a descramble section for extracting information necessary for descrambling, which is received together with scrambled TV signals, and converting the scrambled TV signals to ordinary TV signals in response to control signals input thereto;

a microcomputer system for detecting an IC card connected therewith, for performing viewer-contract management processing by using the information necessary for descrambling, and sending the control signals to said descramble section based on a result of the viewer-contract management processing when not detecting said IC card, and for sending the information necessary for descrambling to said IC card and sending the control signals from said IC card to said descramble section without performing the viewer-contract management processing when detecting said IC card; and said IC card, said IC card connectable with said microcomputer system, for receiving the information necessary for descrambling from said microcomputer system and performing the viewer-contract management processing by using the information necessary for descrambling and then sending the control signals to said microcomputer system based on a result of the viewer-contract management processing.

2. The descrambler as claimed in claim 1, wherein said IC card compares its own ID with an ID contained in the information necessary for descrambling, and when matched, takes individual information contained in the information necessary for descrambling and performs the viewer-contract management processing.

3. The descrambler as claimed in claim 1, wherein said microcomputer system, when said IC card is connected, inputs and stores an ID from said IC card, and compares the stored ID with an ID contained in the information necessary for descrambling, and when not matched, does not send the information necessary for descrambling to said IC card.

4. The descrambler as claimed in claim 1, further comprising:

a memory for storing an ID, and a processing section for inputting the information necessary for descrambling thereto from said descramble section, comparing said ID stored in the memory with the ID contained in the information necessary for descrambling, and when matched, sending the information necessary for descrambling to said microcomputer system.

5. The descrambler as claimed in claim 1, wherein said microcomputer system confirms whether said IC card is connected or not by trying to communicate with said IC card.

6. The descrambler as claimed in claim 1, wherein the information necessary for descrambling is in a packet form and time-divisionally multiplexed or frequency multiplexed in video signals or audio signals.

7. A descrambler, comprising:

a descramble section for extracting information necessary for descrambling, which is received together with scrambled TV signals, and converting the scrambled TV signals to ordinary TV signals in response to control signals input thereto;

a microcomputer system for performing viewer-contract management processing by using the information necessary for descrambling, and sending the control signals to said descramble section based on a result of the viewer-contract management processing when not receiving information which instructs said microcomputer system to be under the control of an IC card from said descramble section, and for sending the information necessary for descrambling to said IC card and sending the control signals from said IC card to said descramble section without performing the viewer-contract management processing when receiving the information which instructs said microcomputer system to be under the control of said IC card; and said IC card, said IC card connectable with said microcomputer system, for receiving the information necessary for descrambling from said microcomputer system and performing the viewer-contract management processing by using the information necessary for descrambling and then sending the control signals to said microcomputer system based on a result of the viewer-contract management processing.

8. A descrambler as claimed in claim 7, wherein said microcomputer system displays a message which urges connecting the IC card therewith when receiving the information which instructs said microcomputer system to be under the control of said IC card from said descramble section but not having said IC card connected therewith.

* * * * *